Sept. 5, 1961 M. SPAT 2,999,000
LUBRICATING ARRANGEMENT FOR CO-AXIAL SHAFTS
Filed April 14, 1960
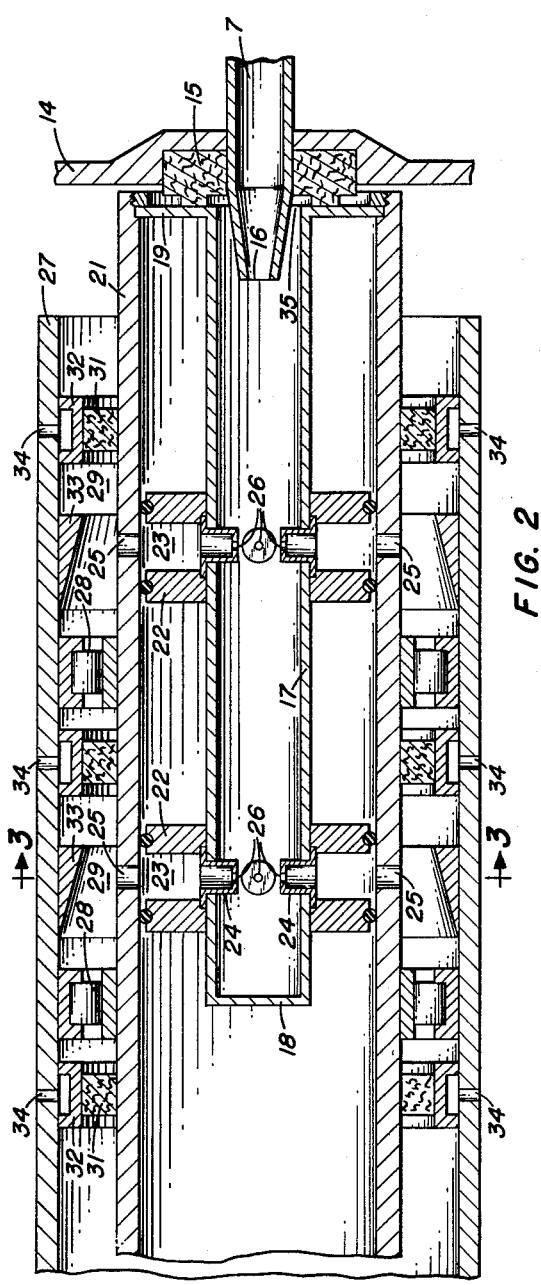
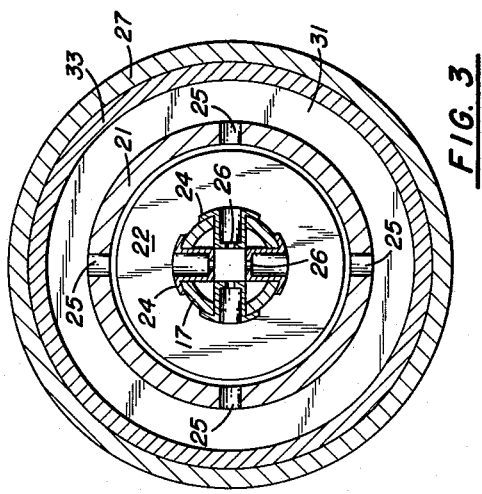
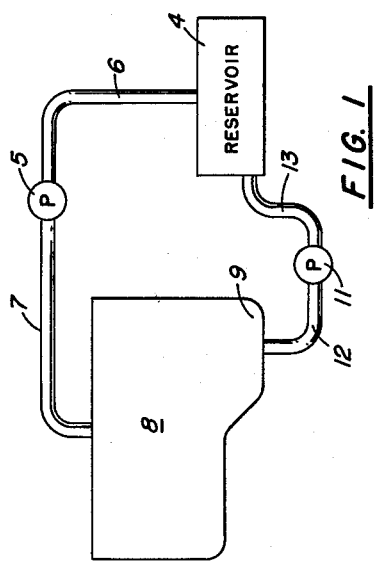
Inventor
MELVIN SPAT
By R. J. Tompkins
Attorney

United States Patent Office 2,999,000
Patented Sept. 5, 1961

2,999,000
LUBRICATING ARRANGEMENT FOR CO-AXIAL SHAFTS
Melvin Spat, Salem, Mass., assignor, by mesne assignments, to the United States of America as represented by the Secretary of the Navy
Filed Apr. 14, 1960, Ser. No. 22,375
7 Claims. (Cl. 308—187)

The present invention relates to a lubricating arrangement for rotating machinery and more particularly for use in gas turbine engines which have co-axial shafts rotating at varying differential speeds. The lubricating system provides an approximately uniform lubricant flow to bearings located between the co-axial shafts notwithstanding that the shafts' differential speed vary over a wide range.

A common method of supplying lubricant to bearing surfaces between co-axial shafts is the use of a fluid supply tube running along the axial centerline of the inner shaft, with radial tubes delivering the fluid to the places required. If the outer shaft is set into rotation with the inner shaft stationary (or at low speed), the fluid requirements at the bearings in the intershaft region is at a maximum. Since the inner shaft must have the fluid supplied to its central tube through a rotating seal, the pressure at which the fluid is supplied must be kept low to minimize seal leakage. For the same reason the radial tubes have generous diameters. When the inner shaft increases its speed to approach the speed of the outer shaft the fluid requirements at the bearings in the intershaft region decrease.

With this arrangement, disadvantages arise. First, it can be seen that centrifugal force will cause a pressure rise in the radial tubes proportional to the square of the r.p.m. With increasing r.p.m., therefore, the flow of fluid will increase until cavitation occurs somewhere in the fluid supply system. If several areas in series are served by the central tube, cavitation upstream of the first radial tube would result in starvation of succeeding tubes.

The general purpose of this invention is to improve the reliability of a lubricating system supplying fluid to bearings located in the intershaft space between co-axial shafts. More specifically, the invention provides a unique arrangement whereby a high pressure lubricating or cooling fluid is distributed to intershaft spaces which require lubrication, i.e., spaces in which differential bearings and seal rings are located. Notwithstanding the fact that the inner shaft receives fluid through a rotary seal, the present invention prevents excessive leakage across such a seal even with a high pressure source of fluid lubricant. Additionally, the arrangement minimizes the percentage increase of oil flow to areas requiring lubrication, from the maximum flow required when the inner shaft is stationary to the flow required when the inner shaft rotates at the speed of the outer shaft. Since the flow does not greatly increase when the inner shaft is rotating at the speed of the outer shaft cavitation is prevented in the supply system.

To obtain the above results the present invention provides a nozzle which ejects into a supply tube mounted within the inner co-axial drive shaft and is sealed against leakage by a rotary seal. The ejection minimizes leakage. The supply tube contains radial tubes which extend from the peripheral wall of the supply tube to near the center of rotation. Orifices are located in the radial tubes at the end of the tubes near the center of rotation. This arrangement reduces cavitation.

An object of the present invention is the provision of a means of supplying lubricant and/or coolant as required in rotating machinery which have co-axial shafts rotating at varying differential speeds particularly as applied to gas turbine engines.

Another object is to provide a means for preventing cavitation in a lubricating supply system for bearings located between co-axial shafts.

A further object is to provide a means for supplying lubricant to bearings between co-axial shafts, which means minimize leakage across sealing surfaces at the inlet to a rotary distributing tube.

Still another object is to prevent increased lubricant flow upon increased speeds of rotation of the distributing tube.

Other objects and many of the attendant advantages of this invention will be readily appreciated as the same becomes better understood by reference to the following detailed description when considered in connection with the accompanying drawings wherein:

FIG. 1 shows a diagrammatic view of the lubricating system;
FIG. 2 shows a preferred embodiment of the invention in longitudinal section;
FIG. 3 shows a section of the device taken on line 3—3 of FIG. 2 looking in the direction of the arrows.

Referring now to the drawings wherein like reference characters designate like or corresponding parts throughout the several views there is shown in FIG. 1 a schematic representation of a standard arrangement for circulating lubricant including a stationary reservoir 4 from which a supply pump 5 takes suction through line 6 and discharges through line 7 to a point of use such as rotary machinery 8. This machinery includes an inventive co-axial rotating shaft lubricating arrangement which is disclosed in detail in the following material. Lubricant is collected after use in sump 9. Lubricant is then pumped from sump 9 by scavenge pump 11 through suction line 12 and discharged through line 13 into reservoir 4.

In FIG. 2 there is shown a header member 14 which contains a rotary resilient seal member 15. Discharge line 7 from pump 5 passes through seal member 15 and terminates adjacent member 15 in a nozzle 16. Nozzle 16 ejects high pressure fluid from pump 5 into a hollow tube 17 which is aranged with respect to co-axial rotary shafts 21 and 27 so as to serve as a lubricant inlet to the points to be lubricated.

Tube 17 is closed at one end 18 and has an open flanged end 19. Flange 19 serves to mount tube 17 within the inner rotary shaft 21. Flange 19 also contacts seal member 15 so as to form a sealing interface. Further support is provided for tube 17 by a number of sealing discs 22, four being shown for illustrative purposes. In addition to providing support for tube 17, discs 22 form annular spaces 23 between tube 17 and inner rotary shaft 21. These spaces provide passageways necessary for fluid distribution as will be described subsequently.

In order to pass lubricant and/or coolant from tube 17, radial tubes 24 are connected to the peripheral wall of tube 17. These tubes open into annular spaces 23 and terminate at the center of rotation. An orifice 26 is located in each radial tube 24 at a point near the center of rotation. The discharge pressure in line 7 will determine the size and number of the orifices required to supply the lubricant required at the worst operating point. Four radial tubes 24 and orifices 26 are shown for each bearing requiring lubrication, such an arrangement only being exemplary of any suitable design. The radial tube orifice arrangement prevents centrifugal pressure buildup due to high speeds of rotation in inner rotary shaft 21. The reason why it is desirable to curtail such pressure will be apparent from the operation of the system which follows.

The inner shaft 21 extends co-axially through an outer rotary shaft 27 in spaced relation thereto and intershaft or differential bearings 28 are provided between the two shafts. Each bearing is enclosed in a chamber 29 formed in the intershaft space by intershaft seals 31 and seal runners 32. However, if the left end of the shafts 21 and 27 needs to be sealed, then the center seal 31 and its associated runner 32 may be eliminated. Also, if the left intershaft space drains directly into the sump 9, then the left end center seal 31 and its associated runner 32 are unnecessary. Lubricant is supplied to chamber 29 through drilled holes 25.

Tapered rings 33 are located on the inner circumference of outer rotary shaft 27, one being located within each of the aforesaid chambers 29. These rings act as slinger pumps on rotation of the outer shaft and will pump lubricant out of the chambers 29 under the seal runners 32 through drilled holes 34 back into sump 9 as shown in FIG. 1. The pumping of the oil under the seal runners 32 is made possible by the clearance between the outer periphery of the runner 32 and the inner periphery of the outer shaft 27.

The overall operation of the system follows. Lubricant and/or coolant is supplied by pump 5 from a stationary reservoir 4 through nozzle 16 to form a jet ejection in the vicinity of seal 15. This high velocity jet causes a low pressure wake in area 35 because of viscous drag. This permits a high discharge pressure in line 7 which pressure is recovered in supply tube 17 without excessive leakage occurring past seal 15. Maximum required flow occurs when inner shaft 21 is stationary and outer shaft 27 is at maximum speed. The orifice areas in radial tubes 24 are therefore calculated to allow such a flow, having the given high pressure of pump 5.

The radial tubes 24 are shown extending inward so that orifices 26 are as close to the center of rotation as is required. If their axial location is staggered, they may be at the center of rotation. Therefore, when the inner shaft 21 commences to rotate, centrifugal forces will throw the oil which is in the radial tubes 24 and in the annular spaces 23 between the sealing discs 22 out through the holes 25 in the inner shaft 21. The flow of oil is then metered by the orifices 26 and is independent (to any desired degree) of speed of rotation. Thus, cavitation and consequent starvation of bearings do not occur. The oil strikes the slinger-pump tapered rings 33 and is pumped (by rotation of outer shaft 27) through the bearings 28, under seal runners 32 and out into sump 9 through holes 34 in the outer shaft 27. From the sump 9, the oil is scavenged by pump 11 and returned to reservoir 4.

If no metering device such as orifice 26 were used, the lubricant flow would increase as the speed of the inner shaft increased. The use of a positive-displacement pump (gear, vane, etc.) would then be mandatory (as it is not in the proposed arrangement) and the system would fail due to cavitation if two or more areas were supplied by fluid lines in series with each other.

If the metering orifice were in the supply line 7, upstream of radial tubes 24 or in the shaft 21, then again the system would not be insensitive to speed of rotation.

Obviously many modifications and variations of the present invention are possible in the light of the above teachings. It is therefore to be understood that within the scope of the appended claims the invention may be practiced otherwise than as specifically described.

What is claimed is:
1. In rotating machinery having co-axial shafts with bearings mounted therebetween, means for supplying lubricant to said bearings which means comprises a rotary tube, a lubricating inlet ejecting into said rotary tube, a plurality of radial tubes extending from the peripheral wall of said rotary tube inwardly to the center of rotation, an inlet in the form of an orifice in each of said radial tubes near said center of rotation, the outlets of said radial tubes supplying lubricant to said bearings, said radial tubes minimizing the effect of centrifugal forces on the lubricant being supplied to said bearings, a bearing chamber, passage means fluidly connecting said radial tubes and said bearing chamber whereby lubricant is supplied to said bearings at approximately uniform flow rates so as to avoid cavitation starvation at the bearing surfaces during high speeds of rotation.

2. Means for supplying lubricant according to claim 1 wherein said lubricating inlet comprises a rotary seal in sealing contact with said rotary tube and a nozzle projecting through said seal into said rotary tube so as to prevent excessive leakage across said rotary seal.

3. Means for supplying lubricant according to claim 1 wherein said passage means comprises sealing discs mounted between an inner co-axial shaft and said rotary tube, and forming an annular space between said rotary tube and the inner co-axial shaft.

4. In rotating machinery having two co-axial shafts with differential bearings mounted therebetween, means for supplying lubricant to said bearings which means comprises a rotary tube, a rotary seal in sealing contact with said rotary tube, a nozzle projecting through said seal into said rotary tube so as to prevent excessive leakage across said rotary seal, radial tubes extending from the peripheral wall of said rotary tube to the center of rotation and orifices located in said radial tubes near said center of rotation, a bearing chamber, passage means fluidly connecting said distributing means and said bearing chamber whereby lubricant is supplied to said bearings at approximately uniform flow rates so as to avoid cavitation in the means for supplying lubricant during high speeds of rotation.

5. Means for supplying lubricant according to claim 4 wherein said passage means comprises sealing discs mounted between an inner co-axial shaft and said rotary tube forming an annular space between said rotary tube and the inner co-axial shaft.

6. Lubricating apparatus for supplying lubricant to bearings located between two co-axial drive shafts comprising a hollow inner drive shaft, an outer drive shaft surrounding said inner drive shaft, a hollow tube mounted within said inner drive shaft, a rotary seal means closing said hollow tube, a nozzle extending through said seal means and ejecting adjacent said seal means so as to prevent excessive seal leakage, orifice means in said rotary tube for minimizing the pumping effect of centrifugal forces on the lubricant being supplied to said bearings, sealing discs mounted between said hollow tube and said inner drive shaft forming a fluid passageway which connects said orifice means and the space between said outer drive and said inner drive shaft, slinger rings mounted between said inner drive shaft and said outer drive, seal runners, seal rings, said seal runners and seal rings being located between said inner drive shaft and said outer drive shaft and forming an intershaft space therewith in which said bearings are located whereby lubricant is supplied to said bearings at approximately uniform flow rates so as to avoid cavitation in the aforesaid apparatus for supplying lubricant, during high speeds of rotation.

7. Lubricating apparatus according to claim 6 wherein said orifice means comprises radial tubes extending from the peripheral wall of said rotary tube to the center of rotation and orifices located in said radial tube near said center of rotation.

References Cited in the file of this patent

UNITED STATES PATENTS

| | | |
|---|---|---|
| 2,289,233 | Beall et al. | July 7, 1942 |
| 2,469,669 | Storey | May 10, 1949 |
| 2,712,967 | Sutton | July 12, 1955 |
| 2,717,184 | Amerman | Sept. 6, 1955 |